Patented Feb. 13, 1940

2,190,121

UNITED STATES PATENT OFFICE 2,190,121

PROCESS FOR OBTAINING COPPER LININGS

Paolo Misciattelli, Rome, Italy

No Drawing. Original application June 7, 1937, Serial No. 146,974. Divided and this application October 12, 1939, Serial No. 299,208. In Italy July 1, 1936

2 Claims. (Cl. 91—69.1)

The present application is a division of my earlier and copending application Serial No. 146,974, filed June 7th, 1937.

The subject matter of my present invention is a process for obtaining copper linings, e. g. for the manufacture of copper mirrors or copper-plated silver mirrors, and the copper or silver mirrors obtained by such method.

My present invention is based on the discovery that formaldehyde is capable, in the cold, of reducing the cuproglyceric (or cuprotartaric) complex to metallic copper in the presence of traces of precipitated silver, or traces of colloidal silver.

The invention is now described in greater detail by means of the following exemplary embodiment thereof which, however, is solely illustrative and not limitative in character.

EXAMPLE

A sheet of glass is washed with stannous chloride and distilled water. A known silvering solution is prepared, comprising for instance ammoniacal silver nitrate and inverted sugar, and this solution is added in such manner that the silver is deposited in so thin a layer as to give the glass a very faintly blue color if observed by transparency. The glass plate thus prepared is again washed with water, and then the solution (see below) is rapidly poured thereon so as to suddenly flood the whole plate.

Solution 3.5 g. of copper sulphate, 4 g. of glycerin and 4 g. of sodium hydroxide are dissolved in 1000 cc. of distilled water, and to this solution 30 cc. of a 1% gum arabic solution are added.

Before applying this solution to the glass plate, 100 cc. of commercial 40% formaldehyde are added thereto.

According to my present invention the reaction between formaldehyde and caustic soda is prevented by the presence of traces of a colloid, such as gum arabic, agar-agar or the like, as such reaction would produce a consequent development of hydrogen which would cause the detachment of the copper layer from its support.

In order to obtain copper mirrors by starting from the glycerine (cuproglyceric) complex, it is necessary to operate with dilute solutions such as those above indicated, and adding formaldehyde thereto immediately before the use of the said solutions.

When operating at ordinary temperature for obtaining a good and sufficiently thick deposit of copper, a period of time of from one-half to one hour will be needed according to the temperature of the surrounding atmosphere.

A preferred form of the invention has been described above, but it will be understood by those skilled in the art, that both the solution and the process may be modified in their non-essential details without departing from the scope of my invention.

Having now particularly described and ascertained the nature of my said invention and in what manner the same is to be performed, what is claimed is:

1. The process for the production of copper linings for the manufacture of copper mirrors, coppered silvered mirrors and the like, comprising precipitating metallic copper in the cold by reduction with a reducing agent consisting of formaldehyde in the presence of silver from a solution consisting of caustic soda, gum arabic, a cuproglycerate, and water.

2. The process for the production of a copper lining upon a support, comprising first producing a very thin layer of silver on said support, and then precipitating a lining of metallic copper in the cold on said thin silver layer by reduction with a reducing agent consisting of formaldehyde from a solution consisting of caustic soda, gum arabic, a cuproglycerate, and water.

PAOLO MISCIATTELLI.